Dec. 23, 1969   M. L. CLYMIN   3,485,704
THERMO-ADHESIVE CARPET-SEAMING TAPE
Filed Dec. 16, 1968
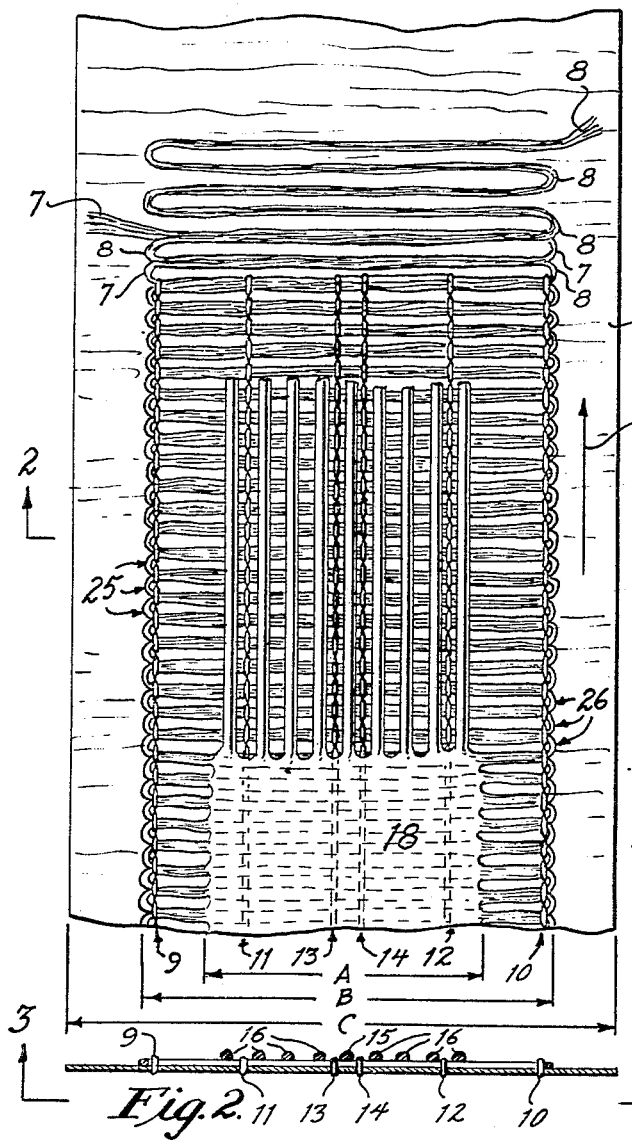
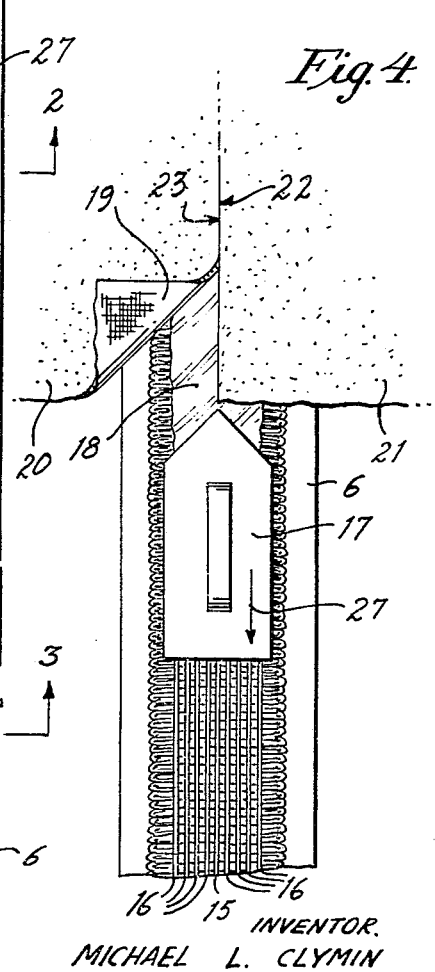
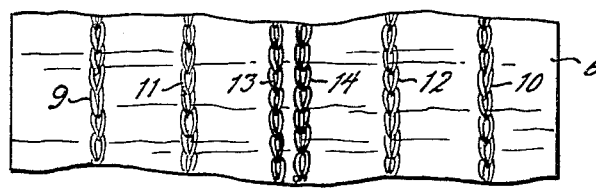
Fig. 3.
INVENTOR.
MICHAEL L. CLYMIN
BY Leonard L. Kalish
ATTORNEY.

United States Patent Office 3,485,704
Patented Dec. 23, 1969

3,485,704
THERMO-ADHESIVE CARPET-SEAMING TAPE
Michael L. Clymin, White Plains, N.Y., assignor, by mesne assignments, to Conso Engineering Company, Baltimore, Md., a corporation of Maryland
Filed Dec. 16, 1968, Ser. No. 783,914
Int. Cl. A47g 27/04
U.S. Cl. 161—51                     11 Claims

ABSTRACT OF THE DISCLOSURE

A carpet-seaming tape comprising a tape-base having a plurality of spaced-apart tracks, ribs or beads (or other particulate forms) of a thermoplastic or hot-melt adhesive extending longitudinally thereof or distributed therealong and adhered thereto, and adapted to be melted and to spread and flow together upon the application of heat thereto just prior to the application thereto of the two juxtaposed marginal portions of the backs of adjacent pieces of carpet, thereby visually to indicate to the operator when the adhesive is in a condition operatively to receive and effectively bond such marginal zones of the backs of the two carpet-pieces to the tape-base and better to adhere to such marginal portions of the backs of the carpet pieces to the tape-base, such particulation of the adhesive also permitting it to be activated more readily.

The field of the invention

The present invention relates to the seaming of two adjacent and abutting pieces of carpet to each other by means of a tape in back of the two carpet-pieces along the abutting marginal zones thereof, to which tape such zones are adhesively secured so as to present a generally seamless appearance when viewing the face of the seamed carpet as it lays on the floor.

The present invention relates more particularly to thermoplastic or hot-melt carpet-seaming tapes for this purpose, or what may be referred to as iron-on tapes, in which a thermoplastic or hot-melt adhesive is pre-applied to the tape and is solidified thereon and adhered thereto and thereafter is re-melted or re-activated by heat applied thereto just prior to the seaming operation.

The prior-art

It has heretofore been the practice to provide the thermoplastic or hot-melt carpet-seaming tapes both for the face-seaming and the back-seaming of adjacent and abutting pieces of carpet. Such tapes comprise a tape-base or base-strip having a solid or undivided layer of thermoplastic or hot-melt adhesive thereon. The adhesive is re-melted just prior to its application to the adjacent marginal zones and backs of the two carpet pieces, so that the latter will adhere thereto. Such re-melting is accomplished by applying an electric-iron or a hot-air-blower to the thermoplastic adhesive layer and progressively moving the electric iron or blower along the tape as the adhesive melts, and progressively applying and pressing the marginal zones of the backs of the carpets onto the two halves of the tape so that when the melted adhesive resolidifies it will unite the backs of the carpet-pieces to the tape, thereby forming a generally invisible seam.

In the use of the prior thermoplastic carpet-seaming tapes it is difficult for the operator to know at what rate he should move the electric iron (or blower) along the tape and correspondingly to overlay the two marginal zones of the backs of the carpet thereon, because he cannot readily tell when the adhesive has melted, as there is no readily visible change in the appearance of the adhesive upon the melting of an undivided layer of thermoplastic adhesive. If he moves the iron (or blower) too fast, so that the thermoplastic adhesive is not sufficiently melted, poor or inadequate adhesion is obtained, and the resultant seam is not completed or is not strong enough.

Summary of the invention

To overcome this difficulty with the prior thermoplastic carpet-seaming tapes, the present invention provides a plurality of spaced-apart tracks, ribs or beads of thermoplastic adhesive on the tape-base, of a height substantially greater than the final height of the molten adhesive after the backs of the two carpet-pieces have been pressed against it and the tape-base thus adhered to the back of the carpet, so that by applying heat, the spaced-apart tracks, ribs or beads of thermoplastic adhesive are melted down and spread out, thereby increasing the areas thereof and reducing the spacings between them and even merging them into each other to form a continuous layer of molten adhesive, depending on the original size of the cross-sections thereof and the spacing-distances therebetween. Hence, the adequacy of the activation of the adhesive can be observed on the first 3″ or 4″ (or more) of the tape at the starting-end thereof (before any of the carpet is layed onto the activated adhesive), and as the seaming progresses an edge of the carpet can be lifted up or its lay-down delayed for a second or so to see whether the adhesive is sufficiently activated, whereby the carpet-installer can gauge the correct rate at which to move the electric iron (or other heating means) along the tape and correspondingly to apply the carpet-pieces to the activated adhesive.

This enables the operator at all times to obtain a sound and effective bonding or adhesion between the tape and the marginal zones of the backs of the two carpet-pieces and so enables him to avoid defective seams or seams of insufficient strength or durability.

Brief description of the drawings

FIGURE 1 represents a top plan view of the face of a face-seaming tape representing one embodiment of the present invention, with a portion of the thermo-adhesive tracks or ribs omitted so as better to show the yarns overlayed by such tracks or ribs and with a portion of the warp-knitted chains of stitches also omitted so as better to show the two carpet-seaming filler-yarns or weft-yarns, and with a portion of the adhesive tracks or ribs shown melted down and merged into each other.

FIGURE 2 represents a section on line 2—2 of FIGURE 1.

FIGURE 3 represents a plan view of the back of the tape shown in FIGURE 1, as viewed on line 3—3 of FIGURE 2.

FIGURE 4 represents a top plan view of the tape in the course of its application to the two pieces of carpet in the face-seaming operation; also showing the electric iron applied thereto and progressively moved in the direction of the arrow shown on the iron.

Description of the preferred embodiments

The carpet-seaming tape of the present invention comprises a tape-base and spaced-apart ribs, tracks or beads of a thermo-adhesive thereon, extending generally lengthwise thereof.

In my now preferred embodiment of my invention, the tape-base includes a backing strip of crinkled or crepe paper 6, two sets of generally untwisted multi-filament seaming-yarns 7 and 8 of high-tenacity rayon or glass fiber, which yarns are extended, weftwise, back-and-forth transversely of the paper strip 6, and are stitched thereto by a plurality of warpwise extending chains of warp-knitted stitches 9 and 10 along what may be regarded as the selvage lines of the transverse yarns 7 and 8 and similarly knitted chain-stitches 11 and 12 spaced inwardly therefrom and a pair of more closely spaced and generally centrally disposed similarly knitted center-marking chain-stitches 13 and 14. Such warpwise knitted chains of stitches extend through the paper-strip 6 as indicated in FIGURES 2 and 3. Each of the knitted stitches embraces and hence fastens to the paper-strip 6 one pass of the weft-yarn 7 and one pass of the weft-yarn 8.

The transverse seaming yarns 7 and 8 are preferably composed of generally untwisted or soft-twisted bundles of filaments of high tensile strength and low extensibility and high dimensional stability, as, for instance, glass filaments (or fiber glass) or high-tensile nylon or high-tenacity rayon or other high-tensile synthetic filaments or high-tensile natural-fiber yarns.

The warp chains 9 to 14 may be of twisted cotton yarn or other yarn and need not have any great tensile strength or dimensional stability.

The above-described tape-base structure (or what may also be regarded as the base-strip) is generally that shown and described in U.S. Patent 2,727,295 dated Dec. 20, 1955, excepting for the two closely-spaced center-marking warp-chains 13 and 14. For the center-marking warp-chains 13 and 14 I prefer to use yarn dyed a dark color (such as black, blue, red or the like), as distinguished from the generally un-dyed warp-chains 9 to 12, so that these two closely-spaced knitted warp-chains 13 and 14 will serve to guide the operator or carpet-installer in centering the abutting edges 22 and 23 of the two pieces (20 and 21) of carpet (to be seamed) on the longitudinal center-line of the tape. By so making the center-marking warp-chains 13 and 14 a dark color they will also show through the generally transparent or translucent layer 18 of the molten thermo-adhesive, during the seaming operation.

Onto the above-described (or other suitable) tape-base a plurality of thermo-adhesive tracks or ribs 15 and 16 of suitable cross-section are extruded in a soft and adhesive or tacky condition, through as many corresponding nozzles or nozzle-openings of a suitably heated extruder of any suitable conventional or other construction. The tracks or ribs 15 and 16 adhere to the yarns 7 and 8 and to the exposed portions of the paper 6 therebetween. In the preferred embodiment shown, nine such tracks or ribs are extruded onto the tape-base. The center track or rib 15 is disposed between the two center-marking knitted warp-chains 13 and 14, while four of the other eight tracks or ribs 16 are on one side of the center and four on the other side thereof, as indicated in FIGURES 1 and 2.

When these hot-extruded tracks or ribs (15 and 16) cool off and hence solidify on the tape-base, their final cross-section may be slightly modified. If the original cross-section thereof is circular as in a now preferred embodiment shown in the drawings, then the final cross-section thereof may be slightly oval or elliptical, with the major axis of the cross-section generally parallel to the tape-base and the minor axis at a right angle thereto.

Any suitable thermoplastic of high adhesive strength and suitable flexibility at ambient temperatures and having a low cracking-temperature, and of suitable softening-temperature and bonding-temperature may be employed. Examples of such thermoplastic adhesives are the polyethylene adhesives made by the Eastman Chemical Company, of Kingsport, Tenn., under its trademark "Eastobond," as, for instance, its "Eastobond M–8," which is a polyethylene with a plasticizer and an anti-oxidant, and which is a solid having suitable slight flexibility at all normal ambient temperatures and has a softening-temperature of the order of 210° F., and whose optimum bonding-temperature is of the order of 375° to 425° F. Its viscosity is of the order of 14,200 cp. at 375° F. by the Brookfield test, and its specific gravity is 0.932 gram per cubic centimeter at 25° C.

Another and more preferred thermo-adhesive is the Eastman Chemical Company's "Eastobond" which at present bears its designation "L–8080–166". This is a high-viscosity polyethylene and includes an anti-oxidant and a plasticizer, is sufficiently flexible at ambient temperatures, and its softening-temperature is of the order of 221° F. and its optimum bonding-temperature is of the order of 400° to 425° F., and it has a viscosity of 16000 cp. at 375° F. by the Brookfield test and its cracking temperature is at or below 10° to 15° F., and its specific gravity at 25° C. is 0.914 gram per cubic centimeter.

The foregoing examples of thermoplastic adhesives are merely illustrative, and other suitable thermo-adhesives may be used. The thermo-adhesive marketed by the United Shoe Machinery Company under the trademark "Thermogrip" and other thermo-adhesives marketed by United Shoe Machinery Co. are examples of other thermo-adhesives.

I prefer to use a thermoplastic adhesive which is transparent or translucent.

In the preferred embodiment, the cross-sectional area of each of the tracks or ribs 15 and 16 is that of (or equal to) the area of a circle having a diameter of the order of one-tenth of an inch to one-eighth of an inch, more or less, and the spacing between the adjacent ribs or tracks 15 and 16 is such (in relation to each other and in relation to the viscosity of the adhesive at its bonding temperature) that when sufficient heat is applied thereto by means of the electric-iron 17 (shown schematically in FIGURE 4) or by an other suitable heating means, the resultant spreading of the material of the molten tracks or ribs will be sufficient to form a more or less continuous layer of molten adhesive designated by the reference-numeral 18 in FIGURES 1 and 4. However, the number of tracks or ribs and the spacing therebetween and their cross-sectional area may be varied and still achieve such merging thereof into a continuous layer 18. The so formed continuous molten layer 18 will be of a thickness of substantially less than the vertical dimension of the tracks or ribs (15 and 16), but should still be of sufficient thickness to form a good adhesive bond with the back surfaces 19 of the carpet-pieces 20 and 21.

Instead of so proportioning their cross-sectional areas and spacings (in relation to each other and in relation to their bonding viscosity) that they will merge into each other and so form a continuous layer of adhesive, these factors may be so proportioned in relation to each other that when heated to bonding temperature they will spread towards each other without actually merging into a continuous layer, but yet providing a visible criterion of the readiness of the adhesive to receive and adequately bond the two pieces of carpet to the tape-base. Thus, such readiness may be indicated by the increase in the areas of the tracks or ribs and the reduction of the spacings between the tracks or ribs.

With circularly cross-sectioned ribs or tracks which are initially of one-tenth of an inch in diameter, more or less, the centers thereof (as extruded and as laid onto the tape-base) may be spaced two-tenths of an inch apart, more or less. This will result in a continuous layer of the molten thermoplastic whose width "A," generally indicated in FIGURE 1, will be of the order of 2", more or less. The portions of the weftwise seaming-yarns 7 and 8 which are so overlayed by the continuous layer 18 of molten thermo-adhesive become embedded therein.

In the embodiment shown in the drawings, the distance "B" between selvages of the weftwise seaming-yarns 7 and 8 is approximately 3", while the width "C" of the underlying adhesive-barrier backing-strip 6 (of paper or other suitable webbing) is approximately 4".

These widths "A," "B" and "C" may be varied, however. Thus, for instance, the distance "B" between the selvages may be reduced to two-and-one-half inches or to two-and-quarter inches, or indeed to the same width as that of the continuous layer of molten adhesive "A." Likewise, the width "C" may be correspondingly reduced to three inches or three-and-a-quarter inches so that just sufficient of the paper extends beyond the molten adhesive layer 18, on each side thereof, to guard against any of the molten adhesive running out onto the floor or onto the carpet-padding.

While the thermo-adhesive carpet-seaming tape shown in the drawings and described above represents my presently preferred embodiment of my invention, I may embody my invention in other forms. Thus, instead of the tape-base being composed of a paper-strip 6 and the weft-yarns 7 and 8 and the warpwise chains of knitted stitches 9 to 14, I may use a strip of woven, knitted or other textile fabric (or a strip of felted material or a strip of other suitable sheet material) having sufficient transverse tensile strength and capable of forming a good bond with the thermo-adhesive, but which will not allow the thermo-adhesive to flow therethrough.

Thus, I may use, for instance, a strip of woven fabric having weft-yarns of suitably high tensile strength and of sufficiently low twist so that they will form a good bond with the molten adhesive, but yet woven just sufficiently close to prevent the generally viscous molten adhesive from flowing entirely through the fabric. In this manner I may eliminate the backing strip or adhesive-barrier strip 6, by making the width "B" of such fabric strip slightly greater than the width "A" of the molten layer 18 of adhesive.

I may also use open-mesh type woven or knitted fabric strips (having high-tensile weft yarns of rayon, glass or nylon) through which the molten adhesive will flow, as for instance the open mesh fabrics of Patents 2,523,865 and 2,692,842, with an underlying adhesive-barrier strip 6.

When using such open-mesh knitted or woven fabrics, the open-mesh fabric may be secured to the underlying adhesive-barrier strip 6 by the adhesive ribs or tracks themselves, which will penetrate through the open-mesh fabric sufficiently to adhere to the underlying barrier-strip 6. In this manner no additional or separate securement is necessary between the open-mesh seaming-fabric and the barrier-strip.

Likewise, in overlying the yarns 7 and 8 on the backing-strip 6 in the embodiment indicated in FIGURE 1. the yarns 7 and 8 may also be secured to the strip 6 by means of the hot-extruded plastic tracks or ribs 15 and 16, without the aid of the warpwise knitted chains of stitches 9 to 14. In such case, the selvage portions 25 and 26 of the weft yarns 7 and 8 will be brought more closely together, so that they are just sufficiently outside the two outermost plastic ribs or beads 16 to permit the U-shaped selvage portions 25 and 26 thereof to be held in place by suitable mechanical means until the two outermost beads 16 have solidified. The width "C" of the barrier-strip 6 may be correspondingly reduced.

Instead of dividing the total adhesive into spaced-apart continuous track-like or rib-like lines thereof as in the preferred embodiment shown in the drawings, I may apply the hot adhesive to the tape-base in the form of round or elongated beads of suitable size and spacing.

FIGURE 4 shows the general manner of the use of the seaming-tape of my invention in the face-seaming of adjacent carpet pieces 20 and 21. To form a seam by means of the tape of my present invention, the tape is laid on the floor or on top of the carpet-padding (if padding is used) with the adhesive side thereof facing up, and the carpet pieces 20 and 21 are laid over the tape, face up, with the two abutting edges 22 and 23 thereof being generally above the central plastic rib 15 or at least between the two center-marking warp-knitted chains 13 and 14. Thereafter the marginal zones of the carpet are folded back (as indicated in FIGURE 4) and an electric iron 17 or a hot-air-blower or other heating means is applied to the plastic tracks or ribs 15 and 16 until they melt into each other as indicated at 18, and the heating means is then progressively moved in the direction of the arrow 26 so as progressively to melt the plastic ribs or tracks into a continuous layer 18 of molten adhesive. At the same time the two pieces of carpet 20 and 21 are progressively laid back onto the tape and onto the adhesive layer until the seam is thus completed. As the carpet pieces are so laid back into place on the tape, they are pressed down onto the molten adhesive so as to insure a good bonding of the back surfaces 19 of the carpet pieces to the tape.

My invention may be embodied in forms other than those described hereinabove or shown in the accompanying drawings, and the details thereof may be varied, and therefore the foregoing descriptions of the accompanying drawings are intended to be only illustrative of my invention, and the scope of my invention is stated in the following claims.

I claim:

1. A thermo-adhesive carpet-seaming tape including the below-described means arranged visually to indicate its readiness to make an effective bond with the backs of abutting pieces of carpeting, said carpet-seaming tape including a thin and limp tape having high tensile strength and dimensional stability at least in a transverse direction, and a plurality of rows of solidified flexible thermoplastic adhesive adhered to one side of said thin and limp tape and spaced apart from each other, the cross-sectional areas of such rows being sufficiently great in relation to the spacings therebetween so that when heat is applied to said rows they will flow together into a continuous layer, thereby visually to indicate that the adhesive is in a condition to make an effective bond with the backs of abutting pieces of carpet to be pressed thereagainst.

2. A thermo-adhesive carpet-seaming tape including the below-described means arranged visually to indicate its readiness to make an effective bond with the backs of abutting pieces of carpeting, said carpet-seaming tape including a thin and limp tape having high-tensile and dimensionally-stable filaments therein extending transversely thereof, an adhesive-barrier strip on one side of said thin and limp tape and a plurality of rows of solidified flexible thermoplastic adhesive adhered to the other side of said thin and limp tape and spaced apart from each other, the cross-sectional areas of such rows being sufficiently great in relation to the spacings therebetween so that when heat is applied to said rows they will flow together into a continuous layer, thereby visually to indicate that the adhesive is in condition to make an effective bond with the backs of abutting pieces of carpet to be pressed thereagainst.

3. A thermo-adhesive carpet-seaming tape according to claim 2, in which the transversely disposed high-tensile and dimensionally-stable filaments are wefts laid in spaced-apart longitudinal chains of warp-knitted stitches.

4. A thermo-adhesive carpet-seaming tape including the below-described means arranged visually to indicate its readiness to make an effective bond with the backs of abutting pieces of carpeting, said carpet-seaming tape including an open-mesh tape having high-tensile and dimensionally-stable filaments therein extending transversely thereof, and a plurality of rows of solidified flexible thermoplastic adhesive adhered to one side of said open-mesh tape and spaced apart from each other, the cross-sectional areas of such rows being sufficiently great in relation to the spacings therebetween so that when heat is applied to said rows they will flow together into a continuous layer, thereby visually to indicate that the adhesive is in condition to make an effective bond with the backs of abutting pieces of carpet to be pressed thereagainst.

5. A thermo-adhesive carpet-seaming tape according to claim 4, in which the open-mesh tape is a knitted structure and in which the transversely disposed high-tensile and dimensionally-stable filaments are wefts laid in longitudinally extending knitted stitches.

6. A thermo-adhesive carpet-seaming tape including the below-described means arranged visually to indicate its readiness to make an effective bond with the backs of abutting pieces of carpeting, said carpet-seaming tape including an open-mesh tape having high-tensile and dimensionally-stable filaments therein extending transversely thereof, an adhesive-barrier strip on one side of said open-mesh tape, and a plurality of rows of solidified thermoplastic adhesive adhered to the other side of said open-mesh tape and spaced apart from each other, the cross-sectional areas of said rows being sufficiently great in relation to the spacings therebetween so that when heat is applied to said rows they will flow together into a continuous layer, thereby visually to indicate that the adhesive is in condition to make an effective bond with the backs of abutting pieces of carpet to be pressed thereagainst.

7. A thermo-adhesive carpet-seaming tape according to claim 6, in which the open-mesh tape is a knitted structure and in which the transversely disposed high-tensile and dimensionally-stable filaments are wefts laid in longitudinally extending knitted stitches.

8. A thermo-adhesive carpet-seaming tape according to claim 6, in which minor portions of the spaced-apart longitudinal rows of adhesive penetrate through the open-mesh tape and adhere such rows of adhesive also to the barrier-strip; with the major portions of such adhesive rows being disposed exteriorly of such open-mesh tape.

9. A thermo-adhesive carpet-seaming tape according to claim 8, in which the open-mesh tape is a knitted structure and in which the transversely disposed high-tensile and dimensionally-stable filaments are wefts laid in longitudinally extending knitted stitches.

10. A thermo-adhesive carpet-seaming tape including the below-described means arranged visually to indicate its readiness to make an effective bond with the backs of abutting pieces of carpeting, said carpet-seaming tape including a thin and limp tape having high-tensile and dimensionally-stable weft yarns therein extending transversely thereof and laid in spaced-apart longitudinal chains of warp-knitted stitches, and a plurality of rows of solidified flexible thermoplastic adhesive adhered to one side of said thin and limp tape and spaced apart from each other, the cross-sectional areas of such rows being sufficiently great in relation to the spacings therebetween so that when heat is applied to said rows they will flow together into a continuous layer, thereby visually to indicate that the adhesive is in condition to make an effective bond with the backs of abutting pieces of carpet to be pressed thereagainst.

11. A thermo-adhesive carpet-seaming tape including the below-described means arranged visually to indicate its readiness to make an effective bond with the backs of abutting pieces of carpeting, said carpet-seaming tape comprising a thin and generally limp adhesive-barrier strip, high-tensile and dimensionally-stable carpet-seaming filaments on said adhesive-barrier strip and extending transversely thereof, said filaments being spaced from each other sufficiently to permit the molten adhesive referred to hereinbelow to flow into spaces therebetween, a plurality of spaced-apart rows of solidified thermoplastic adhesive adhered to said carpet-seaming filaments and to said adhesive-barrier strip and extending longitudinally of said adhesive-barrier strip, the cross-sectional areas of said rows of thermoplastic adhesive being sufficiently great in relation to the spacings therebetween so that when heat is applied to said rows and the rows are fully melted thereby, they will flow together into a continuous layer of molten adhesive, thereby visually to indicate when the adhesive is in condition to make an effective bond with the backs of the abutting pieces of carpeting to be pressed thereagainst with the molten adhesive also flowing into spaces between said carpet-seaming filaments.

References Cited

UNITED STATES PATENTS

| | | | |
|---|---|---|---|
| 2,290,548 | 7/1942 | Galber | 156—291 |
| 2,727,295 | 12/1955 | Wright | 112—432 |
| 3,134,703 | 5/1964 | Listner | 156—295 X |
| 3,168,749 | 2/1965 | Cala | 2—243 |
| 3,278,960 | 10/1966 | Nardone | 12—142 |
| 3,400,038 | 9/1968 | Burgess | 161—50 |

ROBERT F. BURNETT, Primary Examiner

R. L. MAY, Assistant Examiner

U.S. Cl. X.R.

16—16; 156—295; 161—89, 93, 94, 146, 167